US012306577B2

(12) United States Patent
Takenaga et al.

(10) Patent No.: US 12,306,577 B2
(45) Date of Patent: May 20, 2025

(54) ELECTROPHOTOGRAPHIC MEMBER AND ELECTROPHOTOGRAPHIC IMAGE FORMING APPARATUS

(71) Applicant: CANON KABUSHIKI KAISHA, Tokyo (JP)

(72) Inventors: Masahiro Takenaga, Kanagawa (JP); Yusuke Baba, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 665 days.

(21) Appl. No.: 17/657,810

(22) Filed: Apr. 4, 2022

(65) Prior Publication Data

US 2022/0334506 A1 Oct. 20, 2022

(30) Foreign Application Priority Data

Apr. 12, 2021 (JP) .................................. 2021-067255
Mar. 14, 2022 (JP) .................................. 2022-039155

(51) Int. Cl.
*G03G 5/10* (2006.01)

(52) U.S. Cl.
CPC ............. *G03G 5/105* (2013.01); *G03G 5/104* (2013.01)

(58) Field of Classification Search
CPC ...... G03G 5/105; G03G 5/104; G03G 15/162; C08K 3/26; C08K 3/36; C08K 5/19; C08K 5/50
See application file for complete search history.

(56) References Cited

U.S. PATENT DOCUMENTS

| | | | |
|---|---|---|---|
| 5,120,631 A | 6/1992 | Kanbayashi et al. | |
| 10,168,635 B1 * | 1/2019 | Tomari | G03G 15/162 |
| 10,649,352 B2 | 5/2020 | Tsuji | |
| 2014/0234628 A1 | 8/2014 | Takenaga | |
| 2021/0103236 A1 | 4/2021 | Takenaga | |
| 2021/0371661 A1 | 12/2021 | Takenaga | |
| 2022/0011695 A1 | 1/2022 | Abe et al. | |

FOREIGN PATENT DOCUMENTS

| | | |
|---|---|---|
| JP | 2014-65811 A | 4/2014 |
| JP | 2014-164226 A | 9/2014 |
| JP | 2018-120083 A | 8/2018 |
| JP | 2018-194822 A | 12/2018 |
| JP | 2018-197791 A | 12/2018 |
| JP | 2019-12124 A | 1/2019 |
| JP | 2020-94187 A | 6/2020 |

* cited by examiner

*Primary Examiner* — Stewart A Fraser
(74) *Attorney, Agent, or Firm* — VENABLE LLP

(57) ABSTRACT

An electrophotographic member includes a base layer and an elastic layer on the base layer, wherein the elastic layer includes a matrix rubber, an ionic liquid including an anion and a cation, and an inorganic layered double hydroxide compound, wherein the anion is at least one selected from the group consisting of structural formulae (1) to (3), the cation is at least one selected from the group consisting of structural formulae (4) to (7), and the inorganic layered double hydroxide compound has an average value of interlayer distances of 4 Å or larger and 8 Å or smaller, which are measured by XRD.

12 Claims, 2 Drawing Sheets

ELECTROPHOTOGRAPHIC MEMBER AND ELECTROPHOTOGRAPHIC IMAGE FORMING APPARATUS

BACKGROUND

Field

The present disclosure relates to an electrophotographic member and an electrophotographic image forming apparatus including the electrophotographic member.

Description of the Related Art

For the electrophotographic image forming apparatus, it is required to be capable of forming a high-quality electrophotographic image even on a thick paper of which the paper weight exceeds 300 g/m² and a recording medium of which the surface is not smooth, such as embossed paper. However, when an electrophotographic image is formed on the surface of the recording medium of which the surface is not smooth, there has been a case where the toner is not sufficiently transferred to a recess portion of the surface. For such a problem, it is effective to use an intermediate transfer belt having an elastic layer, which is excellent in followability to a surface shape of the recording medium. Japanese Patent Application Laid-Open No. 2018-194822 discloses an electrophotographic member that can be used for such an intermediate transfer belt. Specifically, the electrophotographic member is disclosed that has a substrate and an elastic layer on the substrate, wherein the elastic layer includes silicone rubber and an ionic liquid, wherein the ionic liquid includes a cation modified with a dimethyl siloxane chain and an anion.

Along with the recent requirement for further enhancement of durability of an electrophotographic image forming apparatus, it is required that the characteristics of the electrophotographic member do not change even after long-term use. Here, according to the studies by the present inventors, when the electrophotographic member according to Japanese Patent Application Laid-Open No. 2018-194822 has been mounted on an electrophotographic image forming apparatus as an intermediate transfer belt, and has been subjected to the formation of electrophotographic images over a long period of time, there has been a case where a degradation of the quality of the electrophotographic image has been observed.

SUMMARY

At least one aspect of the present disclosure is directed to providing an electrophotographic member that contributes to a stable formation of high-quality electrophotographic images. Another aspect of the present disclosure is directed to providing an electrophotographic image forming apparatus that can stably form the high-quality electrophotographic images over a long period of time.

According to one aspect of the present disclosure, there is provided an electrophotographic member that includes a base layer and an elastic layer on the base layer, wherein
- the elastic layer includes a matrix rubber, an anion, a cation and an inorganic layered double hydroxide compound, wherein
- the anion is at least one selected from the group consisting of structural formulae (1) to (3), the cation is at least one selected from the group consisting of structural formulae (4) to (7), and the inorganic layered double hydroxide compound has an average value of interlayer distances of 4 Å or larger and 8 Å or smaller, which are measured by XRD.

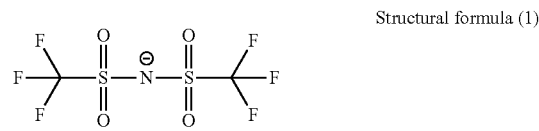
Structural formula (1)

Structural formula (2)

Structural formula (3)

$X^{\ominus}$ (wherein in structural formula (3), X represents a halogen element.)

Structural formula (4)

Structural formula (5)

(wherein in structural formulae (4) and (5), $R_1$ to $R_4$ each independently represent an alkyl group having 6 to 16 carbon atoms, an alkoxy group having 6 to 16 carbon atoms, a hydroxyl group, a phenyl group, a benzyl group or a carboxyl group.)

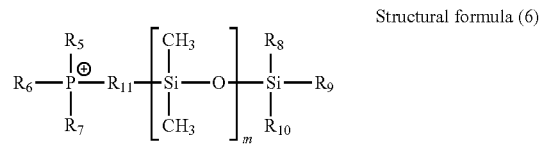
Structural formula (6)

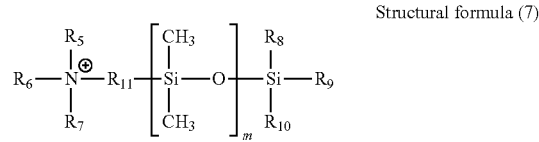
Structural formula (7)

(wherein in structural formulae (6) and (7), $R_5$ to $R_7$ each independently represent an alkyl group having 4 to 16 carbon atoms, an alkoxy group having 4 to 16 carbon atoms, a hydroxyl group, a phenyl group, a benzyl group or a carboxyl group; $R_5$ to $R_{10}$ each independently represent an alkyl group having 1 to 16 carbon atoms;

$R_{11}$ represents an alkylene group having 1 to 16 carbon atoms, which may have a substituent; the alkylene group may have a structure through a group selected from the group consisting of -Ph-, —O—, —C(=O)—, —C(=O)—O—, and —C(=O)—NR— (where R represents an alkyl group having 1 to 6 carbon atoms); and m represents an integer of 1 or more and 16 or less.).

According to another aspect of the present disclosure, there is provided an image forming apparatus for electrophotography including the electrophotographic member as an intermediate transfer member.

Further features of the present disclosure will become apparent from the following description of exemplary embodiments with reference to the attached drawings.

DESCRIPTION OF THE EMBODIMENTS

Figure 1A:
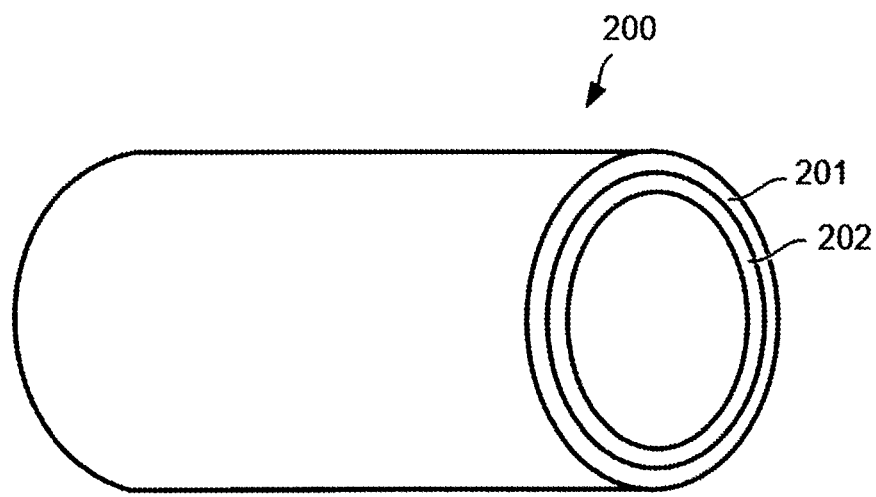
FIG. 1A illustrates a perspective view of an electrophotographic member having an endless shape according to one aspect of the present disclosure.

Preferred embodiments of the present disclosure will now be described in detail in accordance with the accompanying drawings.

The present inventors presumed the reason why the quality of the electrophotographic images has changed with time when the electrophotographic member according to Japanese Patent Application Laid-Open No. 2018-194822 has been used as the intermediate transfer belt, as follows. Specifically, in the elastic layer according to Japanese Patent Application Laid-Open No. 2018-194822, anions and cations exist in a silicone rubber which is a matrix. When a primary transfer voltage has been applied to the electrophotographic member provided with such an elastic layer over a long period of time, it is considered that cations move to a negative electrode side and anions move to a positive electrode side. When the toner is a negatively chargeable toner, the primary transfer voltage to be applied to the intermediate transfer belt is usually applied so that the substrate of the intermediate transfer belt becomes positive and the electrophotographic photoreceptor becomes negative. Because of this, the anion in the elastic layer moves to the interface on a substrate side of the elastic layer. Here, the movement of the cations in the elastic layer is restricted by the interaction with an unshared electron pair of oxygen atom in the silicone rubber. On the other hand, the anion resists receiving the restriction of the movement, which the above cation has received. Because of this, the anion is high in mobility in the elastic layer, and tends to easily be unevenly distributed in the vicinity of the interface on the substrate side of the elastic layer. As a result, the surface resistance (hereinafter, also referred to as "back surface ρs") of the surface of the substrate of the electrophotographic member opposite to the side (hereinafter, also referred to as "back surface") on which the elastic layer is formed tends to become low. Then, in the intermediate transfer belt in which the back surface ρs has been lowered, a transfer current flows on the back surface of the substrate in the circumferential direction thereof, and the toner is transferred from the photoreceptor to the intermediate transfer belt even in the vicinity of the primary transfer portion. In other words, the toner also results in attaching to a portion of a toner image carrying surface of the intermediate transfer belt, onto which the toner should not be fundamentally transferred. Because of this, the quality of the electrophotographic image is degraded. On the other hand, if the movement of anions in the elastic layer is excessively restricted, the electroconductivity of the elastic layer results in being lowered. Then, the present inventors have repeatedly studied a possibility of suppressing the uneven distribution of anions in the elastic layer onto the substrate side, without excessively restricting the movement of the anions in the elastic layer. As a result, the present inventors have found that an elastic layer including a particular cation, a particular anion and an inorganic layered double hydroxide compound is effective in achieving the above object.

Specifically, an electrophotographic member according to one aspect of the present disclosure has a substrate and an elastic layer on the substrate. The elastic layer includes rubber as a matrix, an anion, a cation, and an inorganic layered double hydroxide compound. The anion is at least one selected from the group consisting of the following structural formulae (1) to (3). For information, hereinafter, the inorganic layered double hydroxide compound is simply referred to as a "layered compound", in some cases.

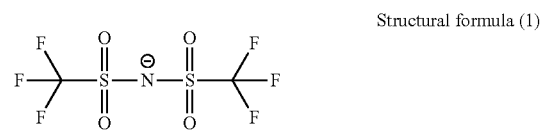

Structural formula (1)

Structural formula (2)

Structural formula (3)

(wherein in structural formula (3), X represents a halogen element.)

The cation is at least one selected from the group consisting of structural formulae (4) to (7).

Structural formula (4)

Structural formula (5)

(wherein in structural formulae (4) and (5), $R_1$ to $R_4$ each independently represent an alkyl group having 6 to 16 carbon atoms, an alkoxy group having 6 to 16 carbon atoms, a hydroxyl group, a phenyl group, a benzyl group or a carboxyl group.)

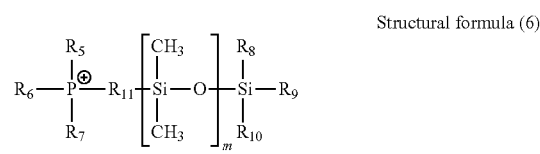

Structural formula (6)

-continued

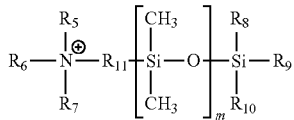

Structural formula (7)

(wherein in structural formulae (6) and (7), $R_5$ to $R_7$ each independently represent an alkyl group having 4 to 16 carbon atoms, an alkoxy group having 4 to 16 carbon atoms, a hydroxyl group, a phenyl group, a benzyl group, or a carboxyl group; $R_5$ to $R_{10}$ each independently represent an alkyl group having 1 to 16 carbon atoms; $R_{11}$ represents an alkylene group having 1 to 16 carbon atoms, which may have a substituent; the alkylene group may have a structure through a group selected from the group consisting of -Ph-, —O—, —C(=O)—, —C(=O)—O—, and —C(=O)—NR— (where R represents an alkyl group having 1 to 6 carbon atoms); and m represents an integer of 1 or more and 16 or less.).

Furthermore, the layered compound has an average value of interlayer distances of 4 angstroms (Å) or larger and 8 Å or smaller, which is measured by an XRD.

The reason why the lowering of the back surface ρs of the substrate can be suppressed by such an electrophotographic member even by application of a voltage over a long period of time is considered as follows. It is considered that in a layered compound having an interlayer distance of 4 to 8 Å, which is measured by XRD, the interlayer distance is larger than a size of the above anion and is smaller than a size of the above cation.

Because of this, the layered compound can selectively capture the above anion. In addition, as the number of anions captured by the layered compound increases, the layered compound itself becomes negatively charged, becomes electronically unstable, and releases the anion. In other words, in the elastic layer according to the present disclosure, it is presumed that an equilibrium state is formed between the capture of the anions by the layered compound and the emission of the anions from the layered compound. In this way, the movement of the anion in the elastic layer can be controlled, and thereby it is considered that the lowering of the back surface ρs of the substrate with time can be suppressed. In addition, the layered compound can maintain the number of anions required for the development of electroconductivity, in the elastic layer, and thereby resists causing an excessive lowering of the electroconductivity of the elastic layer.

Note that in a case where both the anion and the cation are captured in between the layers of the layered compound, the anion and the cation are bonded to each other in between the layers of the layered compound, and become stabilized. It is considered that due to this stabilization, an equilibrium state between the capture of the anions by the above layered compound and the emission from the layered compound resists being formed. Then, it is considered that the layered compound which has captured both the anion and the cation becomes difficult to capture a further anion, and does not perform a function of adjusting the movement of the anion in the elastic layer.

Embodiments of the electrophotographic member according to the present disclosure will be described below in detail. It should be noted that the present disclosure is not limited to the following embodiments.

<Electrophotographic Member>

Figure 1B:
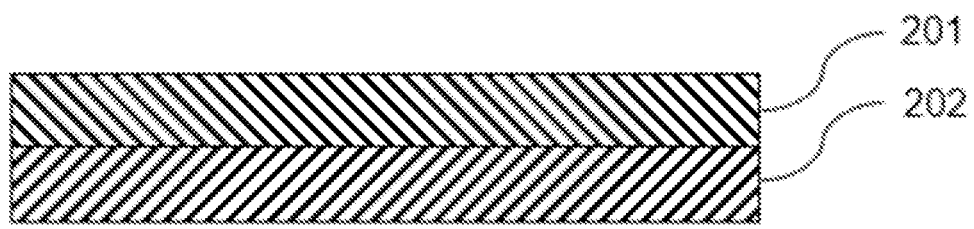
FIG. 1B illustrates a cross-sectional view orthogonal to the circumferential direction of the electrophotographic member illustrated in FIG. 1A.

An electrophotographic member according to the present disclosure has a base layer and an elastic layer on the base layer. The shape of the electrophotographic member is not particularly limited, and can be, for example, a cylindrical shape, a columnar shape or an endless belt shape. FIG. 1A is a perspective view of an electrophotographic member (hereinafter also referred to as "belt for electrophotography") 200 having an endless shape, according to an embodiment of the present disclosure. FIG. 1B is a cross-sectional view orthogonal to the circumferential direction of the belt for electrophotography illustrated in FIG. 1A. The belt for electrophotography 200 includes a base layer 202 having an endless shape and an elastic layer 201 formed on the outer peripheral surface thereof. For information, if necessary, a surface layer (unillustrated) can be further provided on an outer peripheral surface of the elastic layer 201.

The volume resistivity of the electrophotographic member is preferably $1.0 \times 10^8$ Ω·cm or higher and $2.0 \times 10^{11}$ Ω·cm or lower.

<Base Layer>

The base layer to be used can have a cylindrical shape, a columnar shape or an endless belt shape, according to the shape of the electrophotographic member. A material of the base layer is not particularly limited as long as the material is excellent in heat resistance and a mechanical strength. Examples of inorganic materials include: metals such as aluminum, iron, copper and nickel; alloys such as stainless steel and brass; and ceramics such as alumina and silicon carbide.

In addition, examples of organic materials include resins such as a thermoplastic resin and a thermosetting resin. Examples of the thermoplastic resin include resins such as polyether ether ketone, polyethylene terephthalate, polybutylene naphthalate, polyamide, polyamideimide, polyacetal and polyphenylene sulfide. Examples of the thermosetting resin include resins such as unsaturated polyester and polyimide.

Note that when the thermosetting resin or the thermoplastic resin is employed as the material of the base layer, an electroconductive powder such as a metal powder, an electroconductive oxide powder, or an electroconductive carbon may be added and impart electroconductivity to the base layer. A preferable volume resistivity of the base layer is, for example, $1.0 \times 10^8$ Ω·cm or higher and $1.0 \times 10^{11}$ Ω·cm or lower. A preferable surface resistivity of the base layer is, for example, $3.0 \times 10^9$ Ω/□ or higher and $3.0 \times 10^{12}$ Ω/□ or lower.

As the material of the base layer, a resin excellent in flexibility and a mechanical strength is particularly suitable. Among the resins, thermosetting resins and thermoplastic resins, particularly polyether ether ketone which includes carbon black as an electroconductive powder, and polyimide which includes carbon black as an electroconductive powder are preferably used. In addition, the thickness of the base layer having the endless shape is, for example, 10 μm or larger and 500 μm or smaller, particularly 30 μm or larger and 150 μm or smaller.

<Elastic Layer>

The elastic layer includes: a rubber (matrix rubber) as a matrix material; and an anion, a cation and a layered compound which are dispersed in the rubber. More specifically, the elastic layer is formed of such a cured product that the composition is cured which includes at least a raw material of rubber (base polymer, crosslinking agent and the like), an ionic liquid containing an anion and a cation, and a layered compound.

As the matrix rubber, silicone rubber is preferable since the advantageous effect according to the present disclosure can easily be developed. That is, the silicone rubber has a large number of structures of oxygen having an unshared electron pair in the structure, and accordingly tends to easily act on the cation. Therefore, a migration speed of the cation tends to easily decrease, and the difference in the migration speed between the cation and the anion tends to easily become large. In addition, many of the silicone rubber compositions are liquid, and accordingly, it is easy to adjust the elasticity of the elastic layer to be produced, by adjusting the degree of cross-linking according to the type and amount of the material to be added; and accordingly, the silicone rubber is preferable.

The silicone rubber will be described below. The silicone rubber is a cured product that is formed by curing of an addition cure liquid silicone rubber. In general, the addition cure liquid silicone rubber contains the following components (a), (b) and (c).
  (a) An organopolysiloxane having an unsaturated aliphatic group;
  (b) an organopolysiloxane having active hydrogen bonded to a silicon atom; and
  (c) a platinum compound as a crosslinking catalyst.

Examples of the organopolysiloxane that has the unsaturated aliphatic group which is the above component (a) include the following:
  a linear organopolysiloxane in which both molecular ends are represented by $(Ra)_2RbSiO_{1/2}$ and an intermediate unit is represented by $(Ra)_2SiO$ and $RaRbSiO$; and a branched organopolysiloxane which contains $RaSiO_{3/2}$ or $SiO_{4/2}$ as an intermediate unit.

Here, Ra represents an unsubstituted or substituted monovalent hydrocarbon group which is bonded to a silicon atom in the above formulae and does not contain an unsaturated aliphatic group. Examples of the hydrocarbon group include specifically the following:
  alkyl groups (for example, methyl group, ethyl group, propyl group, butyl group, pentyl group and hexyl group); and
  aryl groups (phenyl group, naphthyl group and the like).

Examples of a substituent which the hydrocarbon group may have include: halogen atoms such as a fluorine atom and a chlorine atom; alkoxy groups such as a methoxy group and an ethoxy group; and a cyano group. Specific examples of the substituted hydrocarbon group include a chloromethyl group, a 3-chloropropyl group, a 3,3,3-trifluoropropyl group, a 3-cyanopropyl group, and a 3-methoxypropyl group. Among the substituted hydrocarbon groups, it is preferable that 50% or more of Ra is a methyl group, and it is more preferable that all Ra are methyl groups, because synthesis and handling are easy and excellent heat resistance can be obtained.

In addition, Rb represents an unsaturated aliphatic group which is bonded to a silicon atom in the above formulae. Examples of the unsaturated aliphatic group include a vinyl group, an allyl group, a 3-butenyl group, a 4-pentenyl group, and a 5-hexenyl group. Among the unsaturated aliphatic groups, the vinyl group is preferable because the synthesis and the handling are easy and a cross-linking reaction of the silicone rubber tends to easily proceed.

The organopolysiloxane having the active hydrogen bonded to a silicon atom, which is the above component (b), is a cross-linking agent that reacts with the unsaturated aliphatic group of the component (a) by a catalytic action of the platinum compound which is the component (c) and forms a cross-linked structure. It is preferable that the number of active hydrogen atoms bonded to silicon atoms in the component (b) is a number exceeding three atoms on average in one molecule.

Examples of the organic group bonded to the silicon atom in the organopolysiloxane having the active hydrogen bonded to silicon, which is the component (b), include an unsubstituted or substituted monovalent hydrocarbon group that does not contain an unsaturated aliphatic group, which is the same as Ra in the component (a). In particular, a methyl group is preferable as the organic group because the synthesis and the handling are easy. A molecular weight of the organopolysiloxane having the active hydrogen bonded to the silicon atom is not particularly limited.

In addition, it is preferable for a viscosity of the component (b) at 25° C. to be 10 mm$^2$/s or higher and 100,000 mm$^2$/s or lower, and is more preferable to be 15 mm$^2$/s or higher and 1,000 mm$^2$/s or lower. When the viscosity of the organopolysiloxane at 25° C. is within the above range, it does not occur that the organopolysiloxane volatilizes during storage and does not provide a desired degree of cross-linking or desired physical properties of the formed article; and the organopolysiloxane becomes easy to synthesize and handle, and becomes easy to uniformly disperse in the system.

The siloxane skeleton of the component (b) may be any of linear, branched and cyclic skeletons, and mixtures thereof may be used. In particular, from the viewpoint of ease of synthesis, linear compounds are preferable. In the component (b), an Si—H bond may exist in any siloxane unit in the molecule, but it is preferable that at least a part of the Si—H bond exists in a siloxane unit at a molecular terminal such as an $(Ra)_2HSiO_{1/2}$ unit.

In the addition cure liquid silicone rubber, it is preferable for the amount of the unsaturated aliphatic group is 0.1 mol % or more and 2.0 mol % or less with respect to 1 mol of silicon atoms, and is more preferable to be 0.2 mol % or more and 1.0 mol % or less.

As the above component (c), a known platinum compound can be used.

It is preferable for the hardness of the elastic layer to be 20 degrees or higher and 80 degrees or lower in the type A hardness, and is more preferable to be 45 degrees or higher and 80 degrees or lower.

In addition, in consideration of a mechanical strength and flexibility, it is preferable for the thickness of the elastic layer to be 50 μm or larger and 500 μm or smaller, and is more preferable to be 100 μm or larger and 400 μm or smaller.

<Primer>

A primer may be appropriately applied to the outer surface of the base layer, so as to bond the base layer and the elastic layer more firmly. The primer to be used here is a paint in which a silane coupling agent, a silicone polymer, a hydrogenated methyl siloxane, an alkoxysilane, a reaction promoting catalyst, and a coloring agent such as bengara are appropriately blended and dispersed in an organic solvent. A commercially available product can be used as the primer. Primer treatment is performed by applying this primer to the outer surface of the base layer, and drying or firing the primer. The primer can be appropriately selected according to the material of the base layer, the type of the elastic layer, or the form of the cross-linking reaction. For example, when the elastic layer contains a large amount of unsaturated aliphatic groups, a primer containing a hydrosilyl group may preferably be used since better adhesiveness to the elastic layer can be obtained due to the reaction between the unsaturated aliphatic groups and the hydrosilyl group.

Examples of commercially available primers having such characteristics include DY39-051A/B (produced by Dow Corning Toray Co., Ltd.).

When the elastic layer contains a large amount of hydrosilyl groups, a primer containing an unsaturated aliphatic group may preferably be used. Examples of commercially available primers containing unsaturated groups include DY39-067 (produced by Dow Corning Toray Co., Ltd.). Examples of other types of primers include primers containing alkoxy groups. Further, the surface of the base layer may preferably be subjected to a surface treatment such as ultraviolet irradiation. The surface treatment can accelerate across-linking reaction between the base layer and the elastic layer, and can further enhance an adhesive strength between the base layer and the elastic layer. Examples of primers other than those described above include: X-33-156-20, X-33-173A/B, X-33-183A/B (produced by Shin-Etsu Chemical Co., Ltd.); and DY39-90A/B, DY39-110A/B, DY39-125A/B, and DY39-200A/B (produced by Dow Corning Toray Co., Ltd.).

<Anion>

The anion is at least one selected from the group consisting of chemical compounds represented by the following structural formulae (1) to (3).

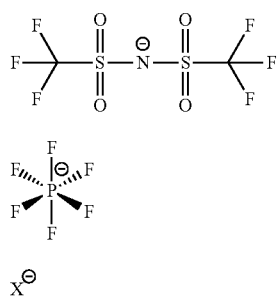

Structural formula (1)

Structural formula (2)

Structural formula (3)

In the structural formula (3), X represents a halogen element such as fluorine, chlorine or bromine.

The anions shown in structural formulae (1) and (2) are hard to interact with water since each of the anions contains a large amount of fluorine. As the result of that, when the elastic layer contains those anions, the mobility of the anions in the elastic layer is less susceptible to moisture in an operating environment. In addition, the anions shown in the structural formulae (1) and (2) have a weak interaction with a cation since an electron is delocalized in the molecular thereof. As the result of that, the cation is prevented from being captured between the layers of the layered compound even when the anions are captured by the layered compound. Accordingly, the anions represented by the formulae (1) and (2) are preferably be employed. In particular, the anion shown in structural formula (1) is weaker in the action with the cation because the electron is more delocalized, and is more preferable. Note that the above anions may be used alone, or two or more types thereof may be used in combination. In addition, the elastic layer may contain anions other than the above anions, if necessary, within such a range as not to disturb the production of the effects of the present disclosure. For example, if the elastic layer contains an anion having a high affinity with the elastic layer matrix rubber used therein, the elastic layer develops more uniform electroconductivity.

Note that it is preferable that the elastic layer according to the present disclosure does not contain anions other than the chemical compounds represented by structural formulae (1) to (3), particularly such other anions as not to be captured by the layered compound. The presence or absence of such other anions can be checked, for example, by the following method. In other words, the sample collected from the elastic layer is immersed in methanol for a predetermined time, and the anions and cations contained in the sample are extracted. Next, the extracted solution is subjected to mass analysis with the use of a liquid ion chromatography mass spectrometer. Then, the presence or absence of peaks of anions which have been used for forming the elastic layer, and a peak other than the peak of a decomposition product of the anion is checked. Then, when other peaks than the peaks of the anions that have been used for forming the elastic layer and the peak of the decomposition product of the anion are not observed, it can be determined that other anions are not contained.

In addition, when a peak derived from an other anion is observed as a result of the mass spectrometry, nuclear magnetic resonance spectroscopy (NMR) and infrared spectroscopy (IR) can be further performed to identify a structure of the other anion.

The cation is at least one selected from the group consisting of chemical compounds represented by the following structural formulae (4) to (7). These cations resist being captured by the layered compound due to the bulkiness originating in the three-dimensional structure around the phosphorus atom or the nitrogen atom.

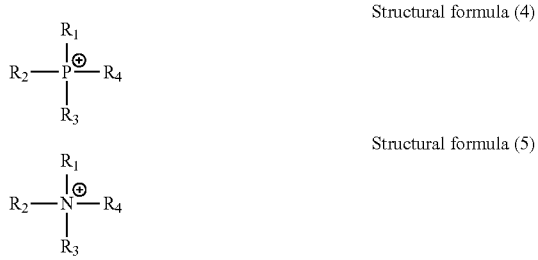

Structural formula (4)

Structural formula (5)

In structural formulae (4) and (5), $R_1$ to $R_4$ each independently represent an alkyl group having 6 to 16 carbon atoms, an alkoxy group having 6 to 16 carbon atoms, a hydroxyl group, a phenyl group, a benzyl group or a carboxyl group. It is particularly preferable that all of $R_1$ to $R_4$ are any one selected from the group consisting of a straight-chain or branched alkyl group having 6 to 16 carbon atoms, a phenyl group and a benzyl group.

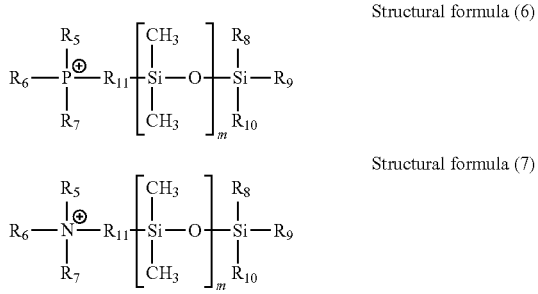

Structural formula (6)

Structural formula (7)

In structural formulae (6) and (7), $R_5$ to $R_7$ each independently represent an alkyl group having 4 to 16 carbon atoms, an alkoxy group having 4 to 16 carbon atoms, a hydroxyl group, a phenyl group, a benzyl group, or a carboxyl group. The alkyl group may be straight-chain or branched. It is particularly preferable that all of $R_5$ to $R_7$ are any one selected from the group consisting of a straight-chain or branched alkyl group having 4 to 16 carbon atoms, a phenyl group and a benzyl group.

$R_8$ to $R_{10}$ each independently represent an alkyl group having 1 to 16 carbon atoms. The alkyl group may be straight-chain or branched. $R_{11}$ is a linking group between a phosphonium structure or an ammonium structure and a dimethyl siloxane chain, and represents an alkylene group having 1 to 16 carbon atoms, which may have a substituent. The alkylene group may be straight-chain or branched. Examples of $R_{11}$ include materials having a form that is obtained by a coupling reaction between a phosphonium salt or an ammonium salt and polydimethylsiloxane, which will be described later in Examples. The alkylene group may have a structure through a group selected from the group consisting of -Ph- (phenylene), —O—, —C(=O)—, —C(=O)—O—, and —C(=O)—NR— (where R represents an alkyl group having 1 to 6 carbon atoms).

The subscript m, i.e. length of dimethyl siloxane chain, is an integer of 1 or more and 16 or less. When m is 16 or less, the ionic liquid can be kept at a low viscosity. The ionic liquid having a low viscosity can suppress a decrease of electroconductivity originating in a decrease of migration speeds of ions in the elastic layer, and accordingly is preferable.

The cation represented by structural formula (6) or (7) is preferable in a point of more resisting being captured between the layers of the layered compound than the cation represented by structural formula (4) or (5) having a similar structure, due to the bulkiness derived from the helical structure of the dimethyl siloxane structure. In addition, the cation represented by structural formula (6) or (7) enhances its compatibility originating in structural similarity, when the elastic layer matrix rubber is the silicone rubber. When the compatibility is enhanced, the dispersion state in the elastic layer tends to easily become uniform, which is also preferable in a point that the electrophotographic member excellent in uniformity of the volume resistivity can be obtained.

Note that the above cations may be used alone, or two or more types thereof may be used in combination. On the other hand, it is preferable that the elastic layer according to the present disclosure does not contain cations other than those described above, in particular, other cations that can be captured between the layers of the layered compound. For information, the presence or absence of such other cations can be checked, for example, by the following method. In other words, the sample collected from the elastic layer is immersed in methanol for a predetermined period of time, and the anions and cations contained in the sample are extracted. Next, the extracted liquid is subjected to the mass analysis with the use of the liquid ion chromatography mass spectrometer. Then, the presence or absence of peaks of cations which have been used for forming the elastic layer, and a peak other than the peak of a decomposition product of the cation is checked. Then, if other peaks than the peaks of the cations that have been used for forming the elastic layer and the peak of the decomposition product of the cation are not observed, it can be determined that other cations are not contained. In addition, when a peak derived from an other cation is observed as a result of the mass spectrometry, nuclear magnetic resonance spectroscopy (NMR) and infrared spectroscopy (IR) can be further performed to identify a structure of the other cation The anions represented by the above structural formulae (1) to (3) and the cations represented by the above structural formulae (4) to (7) can be used in any combination. Non-limiting examples of the combinations are described below.

Combination example 1: structural formula (4)-structural formula (1)

Combination example 2: structural formula (5)-structural formula (2)

Combination example 3: structural formula (6)-structural formula (3)

Combination example 4: structural formula (6)-structural formula (1)

Combination example 5: structural formula (7)-structural formula (1)

The above anions and cations in the elastic layer can be identified by an operation of: immersing the sample collected from the elastic layer in a solvent such as methanol, acetone, or methyl ethyl ketone (MEK) as described above, and subjecting the extracted anions and cations in the solvent to analytical methods such as liquid chromatography mass spectrometry, nuclear magnetic resonance spectroscopy, and infrared spectroscopy.

It is preferable for the total amount of the anion and the cation (content of ionic liquid) with respect to 100 parts by mass of the matrix rubber in the elastic layer to be 0.01 parts by mass or more and 12 parts by mass or less, and is more preferable to be 0.1 parts by mass or more and 9 parts by mass or less. When the total amount of the cation and the anion with respect to the matrix rubber in the elastic layer is set within the above range, it becomes easy to adjust the volume resistivity of the elastic layer within a range of the semiconductive region. Here, the volume resistivity of the elastic layer is adjusted by the amount of the anion or cation to be added, the amount of filler to be added, which will be described later, and the like. When the base layer is electroconductive as described above, the ratio of the volume resistivity of the elastic layer to that of the base layer (volume resistivity of the elastic layer/volume resistivity of the base layer) is preferably 0.01 to 100. For information, the semiconductive region in terms of volume resistivity is in a range of $1.0 \times 10^8$ Ω·cm or higher and $2.0 \times 10^{11}$ Ω·cm or lower.

<Inorganic Layered Double Hydroxide Compound (Layered Compound)>

The layered compound is a substance represented by the following chemical formula.

$$M^{2+}{}_{(1-X)}M^{3+}{}_X(OH)_2A^{n-}{}_{(X/n)} \cdot mH_2O$$

(wherein 0<<X≤0.5, m≥0, $M^{2+}$; divalent metal ion, $M^{3+}$; trivalent metal ion, $A^{n-}$; n-valent anion, and n represents an integer of 1 or more.)

Examples of M of $M^{2+}$ (divalent metal ion) include at least one of Mg, Mn, Fe, Co, Ni, Cu, Zn, Ca, Cd, Pb and Sn(II), and examples of M of $M^{3+}$ (trivalent metal ion) include at least one of Al, Cr, Fe, Co, In, Y, Ce, La, Ga, V, Ti and In. In addition, examples of $A^{n-}$ include at least one of n-valent anions such as $CO_3^{2-}$, $OH^-$, $SO_4^{2-}$, $SiO_4^{2-}$, and a carboxylic acid. The layered compound has a structure in which a part of $M^{2+}$ is replaced by $M^{3+}$, and accordingly, a space between the layers is positively charged and can interact with anions. As $M^{3+}$, $Al^{3+}$ is preferable as the atomic radius is small, and therefore the surface charge density is high, and as a result of that, it tends to easily interact with an anion. In addition, as $M^{2+}$ to be combined with $Al^{3+}$, $Mg^{2+}$ is preferable because a difference in the atomic radius between $M^{3+}$ and $M^{2+}$ is small, and the crystal structure is stabilized. In other words, the layered compound is preferable in which $M^{2+}$ is $Mg^{2+}$, and $M^{3+}$ is $Al^{3+}$ in the above chemical formula. Such a layered compound in which $M^{2+}$ is $Mg^{2+}$ and $M^{3+}$ is $Al^{3+}$ in the above chemical formula can be synthesized, for example, by reacting a mixed aqueous solution of an $M^{2+}$ salt and an $M^{3+}$ salt with an aqueous solution containing an alkaline substance and an interlayer anion. In addition, the layered compound in which $M^{2+}$ is $Mg^{2+}$ and $M^{3+}$ is $Al^{3+}$ in the above chemical formula is commercially available, for example, as "DHT-4C" (trade name, produced by Kyowa Chemical Industry Co., Ltd.), "Hydrotalcite" (produced by Fujifilm Wako Pure Chemical Corporation), and "KW-2100" (trade name, produced by Kyowa Chemical Industry Co., Ltd.).

In the layered compound, an average value of interlayer distance measured by XRD (X-ray diffraction) is 4 Å or larger and 8 Å or smaller.

The interlayer distance is measured by XRD (X-ray diffraction). An average value of the interlayer distance is a value of d which is determined after measurement of interlayer distance by XRD, by substituting n=1, λ (wavelength of X-ray to be used), and θ (angle giving strongest diffraction peak) for Bragg's equation, $$n\lambda = 2d \sin \theta.$$

A layered compound of which the average value of the interlayer distance is 4 Å or larger and 8 Å or smaller tends to easily capture anions represented by the above structural formulae (1) to (3) between the layers, but resists capturing cations represented by the above structural formulae (4) to (7). For example, a distance between two oxygen atoms that are bonded to the same sulfur atom in the anion represented by the above structural formula (1), which is obtained by molecular orbital calculation, is 3 Å. In addition, a distance between the two fluorine atoms is also 3 Å, which are farthest apart from each other in the anion represented by structural formula (2).

On the other hand, in the following structural formula (8) shown as an example of the structural formula (4), a distance between the phosphorus atom and $H_{far}$ is 9 Å (where $H_{far}$ represents a hydrogen atom in the hexyl group which is located farthest from the phosphorus atom). Specifically, it is supported from the viewpoint of the sizes of the cation and the anion that the use of the layered compound having an average value of interlayer distances of 4 Å or larger and 8 Å or smaller makes it easy to capture an anion, but difficult to capture a cation.

Structural formula (8)

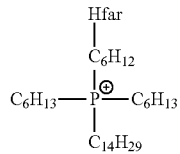

For information, the molecular orbital calculation is based on Gaussian09

(Gaussian 09, Revision D. 01, M. J. Frisch, G. W. Trucks, H. B. Schlegel, G. E. Scuseria, M. A. Robb, J. R. Cheeseman, G. Scalmani, V. Barone, B. Mennucci, G. A. Petersson, H. Nakatsuji, M. Caricato, X. Li, H. P. Hratchian, A. F. Izmaylov, J. Bloino, G. Zheng, J. L. Sonnenberg, M. Hada, M. Ehara, K. Toyota, R. Fukuda, J. Hasegawa, M. Ishida, T. Nakajima, Y. Honda, O. Kitao, H. Nakai, T. Vreven, J. A. Montgomery, Jr., J. E. Peralta, F. Ogliaro, M. Bearpark, J. J. Heyd, E. Brothers, K. N. Kudin, V. N. Staroverov, T. Keith, R. Kobayashi, J. Normand, K. Raghavachari, A. Rendell, J. C. Burant, S. S. Iyengar, J. Tomasi, M. Cossi, N. Rega, J. M. Millam, M. Klene, J. E. Knox, J. B. Cross, V. Bakken, C. Adamo, J. Jaramillo, R. Gomperts, R. E. Stratmann, O. Yazyev, A. J. Austin, R. Cammi, C. Pomelli, J. W. Ochterski, R. L. Martin, K. Morokuma, V G. Zakrzewski, G. A. Voth, P. Salvador, J. J. Dannenberg, S. Dapprich, A. D. Daniels, O. Farkas, J. B. Foresman, J. V. Ortiz, J. Cioslowski, and D. J. Fox, Gaussian, Inc., Wallingford, CT, 2013.), which is widely used at present. The density functional theory (DFT) has been used as a calculation method. B3LYP has been used for the functional, and 6-311G (d, p) has been used for the basis function.

It is preferable for the content of the layered compound with respect to 100 parts by mass of the matrix rubber in the elastic layer to be 0.05 parts by mass or more and 5 parts by mass or less, and is more preferable to be 0.1 parts by mass or more and 2 parts by mass or less. When the content of the layered compound with respect to the matrix rubber in the elastic layer is 0.05 parts by mass or more, the amount of the anion which can contribute to the development of the electroconductivity in the elastic layer can be adjusted more reliably. In addition, when the content is 5 parts by mass or less, even in a case where the compatibility between the layered compound and the rubber as a matrix is low, the layered compound can prevent from being agglomerated in the rubber, and as a result, a formation of the protrusion on the surface of the electrophotographic member due to the agglomerated layered compound.

The existence of the layered compound in the elastic layer can be checked by an operation of immersing the elastic layer in which the anion and the cation have been eluted by the above described method, into a solvent such as a mineral acid, extracting the components which have eluted in the solvent, and analyzing the components. Examples of the analysis method include XRD, DTATG, IR, ion chromatography, and ICP measurement.

(Additive Agent)

The elastic layer may contain additive agents such as a filler, a crosslinking accelerator, a crosslinking retarder, a crosslinking aid, a scorch retarder, an antiaging agent, a softening agent, a heat stabilizer, a flame retardant, a flame retardant aid, an ultraviolet absorber, a rust-preventive agent, and an electron conductive agent, to the extent that the effects according to the present disclosure are not impaired.

Examples of the filler include reinforcing fillers such as fumed silica, crystalline silica, wet silica, fumed titanium oxide and cellulose nanofiber. The surface of the reinforcing filler may be modified with an organosilicon compound such as an organoalkoxysilane, an organohalosilane, an organosilazane, a diorganosiloxane oligomer in which both ends of the molecular chain are blocked with silanol groups, or a cyclic organosiloxane, in order to increase dispersiblity of the reinforcing fillers in the silicone rubber.

Furthermore, when hydrophilic silica is used as the filler, the electroconductivity of the elastic layer can be further enhanced, and the voltage dependence of the electroconductivity of the elastic layer can be further reduced. The voltage dependence means that the resistivity changes depending on an applied voltage at the time of resistance measurement. For example, when a value measured at an applied voltage of 100 V is compared with a resistivity measured at 1000 V, the measured volume resistivity tends to be lower in the case of being measured at 1000 V. Here, the hydrophilic silica specifically refers to silica having a pH value of 7.0 or lower, particularly 3.5 or higher and 5.0 or lower. Examples of such hydrophilic silica include "AEROSIL 90" (pH value: 3.7 to 4.7), "AEROSIL 130" (pH value: 3.7 to 4.5), "AEROSIL 150" (pH value: 3.7 to 4.5), "AEROSIL 200" (pH value: 3.7 to 4.5), "AEROSIL 255" (pH value: 3.7 to 4.5), "AEROSIL 300" (pH value: 3.7 to 4.5), and "AEROSIL 380" (pH value: 3.7 to 4.5), which are produced by Nippon Aerosil Co., Ltd.

Examples of the electron conductive agent include: electroconductive carbon black such as acetylene black and Ketchen black; graphite, graphene, carbon fibers and carbon nanotubes; powders of metals such as silver, copper and nickel; and electroconductive zinc oxide, electroconductive calcium carbonate, electroconductive titanium oxide, electroconductive tin oxide, and electroconductive mica. However, when the electron conductive agent is contained in the elastic layer according to the present embodiment, the voltage dependence of the elastic layer tends to become large. Thus, the elastic layer may preferably be free from the electron conductive agent, or, even if contained, the elastic layer may contain the electron conductive agent in such an amount that electronic conductivity is not developed.

<Surface Layer>

The surface layer is a layer that is provided on the surface of the elastic layer opposite to the side facing the substrate, and is a layer for preventing the toner and an external additive from adhering to the surface of the electrophotographic member. Accordingly, the surface layer is required to have resistance to abrasion caused by rubbing with a recording medium such as paper or various abutting members such as a drum, and to have low adhesiveness so that the toner and the like do not adhere thereto. A resin to be used for the surface layer is not particularly limited as long as the resin has the low adhesiveness, and examples thereof include a fluororesin, a fluorine-containing urethane resin, fluororubber, and siloxane-modified polyimide. The surface layer for an intermediate transfer belt is preferably formed from a fluorine-containing urethane resin, among the above resins, from the viewpoint of not impairing the elastic function of the elastic layer.

A thickness of the surface layer is preferably 0.5 μm or larger and 20 μm or smaller, and is more preferably 1 μm or larger and 10 μm or smaller. When the thickness of the surface layer is 0.5 μm or larger, it becomes easy for the surface layer to suppress the disappearance of the toner due to its abrasion during use. In addition, when the thickness of the surface layer is 20 μm or smaller, the surface layer does not disturb an elastic function of the elastic layer.

The surface layer may contain the above described electron conductive agent, if necessary. It is preferable that the content of the electron conductive agent in the surface layer is 30 parts by mass or less with respect to 100 parts by mass of the surface layer, from the viewpoints of the adhesiveness and a mechanical strength.

In addition, if necessary, a primer layer may be provided between the elastic layer and the surface layer. It is preferable for the thickness of the primer layer to be 0.1 μm or larger and 15 μm or smaller, and is more preferable to be 0.5 μm or larger and 10 μm or smaller, from the viewpoint of not disturbing the elastic function.

The electrophotographic member according to the present disclosure can be manufactured by a method including, for example, the following processes (I) and (II).

(I) A process of forming a layer of an addition cure liquid silicone rubber mixture which contains an addition cure liquid silicone rubber, an ionic liquid and a layered compound, on the base layer; and (II) a process of curing the addition cure liquid silicone rubber in the layer to form a cured product of the addition cure liquid silicone rubber mixture.

The layer of the addition cure liquid silicone rubber mixture can be formed by applying the mixture onto the substrate by a known method. The addition cure liquid silicone rubber can be cured, for example, by heating at 160 to 180° C.

<Image Forming Apparatus for Electrophotography>

The image forming apparatus for electrophotography according to the present disclosure includes the above electrophotographic member according to the present disclosure, as an intermediate transfer member (intermediate transfer belt). An example of the image forming apparatus for electrophotography will be described below with reference to FIG. 2.

The image forming apparatus according to the present disclosure has a so-called tandem structure in which image forming stations of a plurality of colors are arranged side by side in a rotational direction of an endless belt for electrophotography (hereinafter referred to as "intermediate transfer belt"). In the following description, suffixes Y, M, C and k are appended to the symbols of the structures related to the colors of yellow, magenta, cyan and black, respectively, but the suffix is omitted for the same structure, in some cases.

Figure 2:
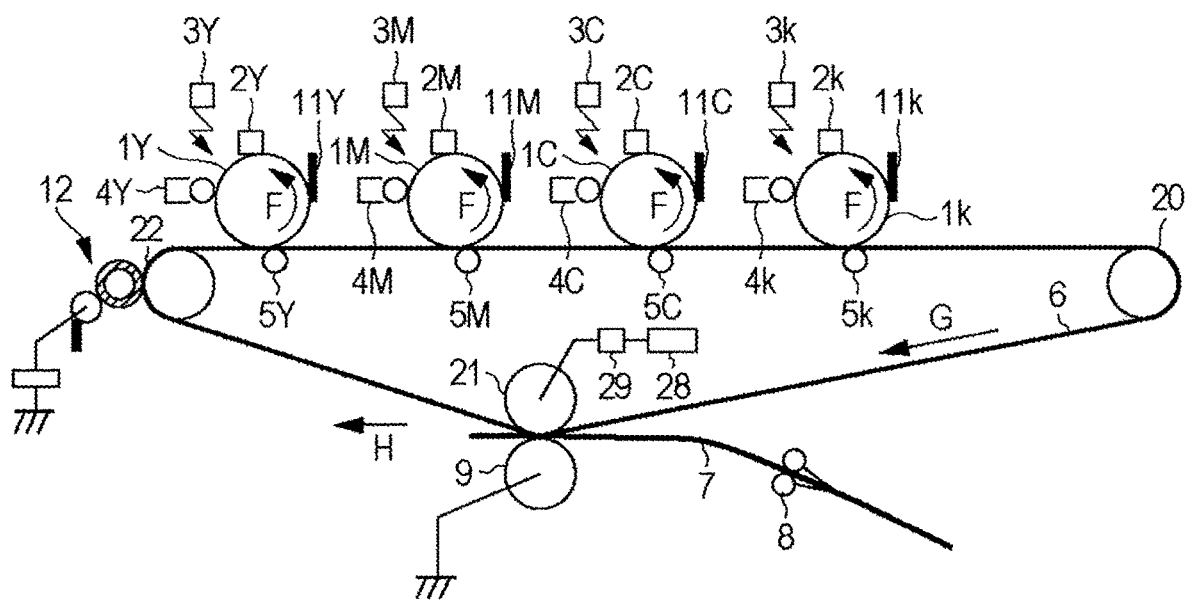
FIG. 2 illustrates a schematic diagram illustrating one example of a full-color electrophotographic image forming apparatus.

Symbols 1Y, 1M, 1C, and 1k in FIG. 2 denote photoreceptor drums (photoreceptor and image carrying body); and charging apparatuses 2Y, 2M, 2C and 2k, exposure apparatuses 3Y, 3M, 3C and 3k, developing apparatuses 4Y, 4M, 4C and 4k, and an intermediate transfer belt (intermediate transfer body) 6 are arranged around the photoreceptor drums 1. The photoreceptor drums 1 are each rotationally driven at a predetermined peripheral speed (process speed) in the direction of the arrow F. The charging apparatuses 2 charge the peripheral surfaces of the photoreceptor drums 1 to a predetermined polarity and potential (primary charging), respectively. The laser beam scanner as the exposure apparatus 3 outputs laser light which has been on/off modulated so as to correspond to image information that is input from an external device such as an unillustrated image scanner and an unillustrated computer, and scans and exposes the charged surface on the photoreceptor drum 1. By this scanning exposure, an electrostatic latent image corresponding to target image information is formed on the surface of the photoreceptor drum 1.

The developing apparatuses 4Y, 4M, 4C and 4k contain toners of color components of yellow (Y), magenta (M), cyan (C) and black (k), respectively. Then, the developing apparatuses 4 to be used are selected based on the image information, an electrostatic latent image on the surface of the photoreceptor drum 1 is developed with a developer (toner), and the electrostatic latent image is visualized as a toner image. In the present embodiment, a reverse development system is used which adheres the toner to the exposed portion of the electrostatic latent image in this way and develops the electrostatic latent image. In addition, the charging apparatus, the exposure apparatus and the developing apparatus constitute an image forming unit, in this way.

In addition, the intermediate transfer belt 6 is an electrophotographic endless belt according to the present disclosure; and is disposed so as to abut on the surface of the photoreceptor drums 1, and is stretched over stretching rollers 20, 21 and 22. In addition, the intermediate transfer belt 6 is configured so that it rotates in the direction of the arrow G. In the embodiment of the present disclosure, the stretching roller 20 is a tension roller structured to control the tension of the intermediate transfer belt 6 so as to be constant; the stretching roller 22 is a driving roller of the intermediate transfer belt 6; and the stretching roller 21 is a counter roller for secondary transfer. In addition, primary transfer rollers 5Y, 5M, 5C and 5k are disposed on primary transfer positions facing the photoreceptor drums 1, respectively, which sandwich the intermediate transfer belt 6 therebetween. Unfixed toner images of the colors, which have been formed on the photoreceptor drums 1, respectively, are sequentially and electrostatically primary-transferred onto the intermediate transfer belt 6, by a primary transfer bias having a polarity opposite to the charging polarity of the toner (for example, positive polarity), which is applied to the primary transfer roller 5 by a constant voltage source or a constant current source. Then, a full-color image is obtained in which unfixed toner images of four colors are superimposed on the intermediate transfer belt 6. The intermediate transfer belt 6 rotates while carrying the toner images which have been transferred thereonto from the photoreceptor drums 1, in this way. At every one rotation of the photoreceptor drum 1 after the primary transfer, the transfer residual toner on the surface of the photoreceptor drum 1 is cleaned by a cleaning apparatus 11, and the resultant surface repeatedly enters the image forming process.

In addition, at the secondary transfer position of the intermediate transfer belt 6, which faces the conveyance path of the recording material 7, a secondary transfer roller (transfer portion) 9 is press-contacted and arranged at the toner image carrying surface side of the intermediate transfer belt 6. In addition, on the back surface side of the intermediate transfer belt 6 at the secondary transfer position, there is disposed the counter roller 21 which forms a counter electrode of the secondary transfer roller 9 and to which a bias is applied. When the toner image on the intermediate transfer belt 6 is transferred to the recording material 7, a bias having the same polarity as that of the toner is applied to the counter roller 21 by a secondary transfer bias application unit 28, for example, −1000 to −3000 V is applied, and a current of −10 to −50 μA flows through the counter roller 21. A transfer voltage at this time is detected by a transfer voltage detecting unit 29.

Furthermore, a cleaning apparatus (belt cleaner) 12 for removing the toner which has remained on the intermediate transfer belt 6 after the secondary transfer is provided on the downstream side of the secondary transfer position.

The recording material 7 which has been introduced into the secondary transfer position is nipped at the secondary transfer position and is conveyed; and at that time, a constant voltage bias (transfer bias) that is controlled to a predetermined voltage is applied to the counter roller 21 of the secondary transfer roller 9 from the secondary transfer bias application unit 28. Due to the transfer bias having the same polarity as that of the toner, which has been applied to the counter roller 21, a full-color image (toner image) of four colors that are superimposed on the intermediate transfer belt 6 is transferred to the recording material 7 at the transfer portion at a time, and a full-color unfixed toner image is formed on the recording material. The recording material 7 on which the toner image has been transferred is introduced into an unillustrated fixing device, and is heated there; and the toner image is fixed.

For information, the present inventors consider a mechanism by which the quality of the printed image is degraded when the back surface ρs of the intermediate transfer belt is lowered, in the following way.

It is considered that the toner scattering is caused by the toner flight in the gap portion before the primary transfer portion. Therefore, when the back surface ρs of the intermediate transfer belt 6 is low, the electric field applied to the gap portion in the front and back of the primary transfer portion becomes stronger than the case where the back surface ρs is high, and accordingly the toner starts to fly from each of the photoreceptor drums 1Y, 1M, 1C and 1k onto the intermediate transfer belt 6, in each of the upstream sides of the primary transfer portions. Because of this, it is considered that the lower the back surface ρs of the intermediate transfer belt 6 is, the more the toner scattering is aggravated.

According to one aspect of the present disclosure, the electrophotographic member can be obtained that contributes to the stable formation of high-quality electrophotographic images. In addition, according to another aspect of the present disclosure, the electrophotographic image forming apparatus can be obtained that can stably form the high-quality electrophotographic images over a long period of time.

EXAMPLES

Synthesis of Ionic Liquids

Production Example 1: Synthesis of Ionic Liquid 2

Into 2.5 g of tetraoctylammonium bromide (produced by Fujifilm Wako Pure Chemical Corporation), 20 mL of methanol was added, and such a solution was added dropwise thereto that 0.6 g of lithium hexafluorophosphate (produced by Kanto Chemical Co., Inc.) was dissolved in 10 mL of methanol. The mixture was subjected to a reaction for 3 hours at room temperature, then the solvent was removed by an evaporator, and the product was purified with the use of column chromatography (trade name: silica gel 60N, 100 to 210 μm, produced by Kanto Chemical Co., Inc.).

A developing solvent of the column is not particularly limited as long as the product is soluble and the R/F value on the TLC (thin-layer chromatography) plate is appropriate, but here, a solution was used in which ethyl acetate and n-hexane were mixed at an arbitrary ratio. Then, the solvent was removed by an evaporator, and an ionic liquid 2 was obtained. This reaction formula is shown below.

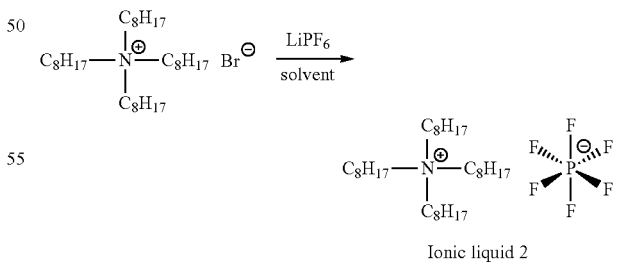

Ionic liquid 2

Production Example 2: Synthesis of Ionic Liquid 3

Into a flask, 2.10 g of triphenylvinylphosphonium bromide (produced by Sigma-Aldrich Co., LLC.), 10.45 g of monohydrogen terminated polydimethylsiloxane (trade name: MCR-H07, molecular weight=about 700 to 1000, produced by Gelest Inc.), and 50 mL of toluene were charged; air in the flask was replaced with nitrogen; and then the flask was sealed.

An isopropyl alcohol solution (0.1 mL) of 0.01 mol % tetrachloroplatinate(II) was added dropwise into the mixed liquid; and the mixture was heated at 80° C., and was reacted for 10 hours. After the reaction ended, the solvent was distilled off by an evaporator, and the product was purified with the use of column chromatography. After that, the solvent was removed by an evaporator, and an ionic liquid 3 was obtained. This reaction formula is shown below.

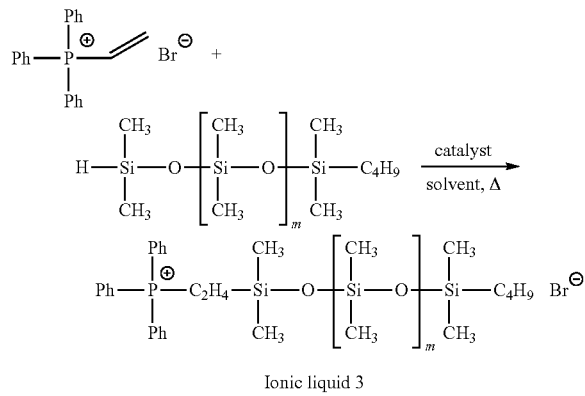

Ionic liquid 3

Production Example 3: Synthesis of Ionic Liquid 4

Into 2.5 g of the ionic liquid 3 obtained in Production Example 2, 20 mL of methanol was added, and such a solution was added dropwise thereto that 0.6 g of lithium bis(trifluoromethane sulfonyl) imide (produced by Kanto Chemical Co., Inc.) was dissolved in 10 mL of methanol. The mixture was subjected to a reaction for 3 hours at room temperature, then the solvent was removed by an evaporator, and the product was purified by column chromatography; and after that, the solvent was removed by an evaporator, and an ionic liquid 4 was obtained. This reaction formula is shown below.

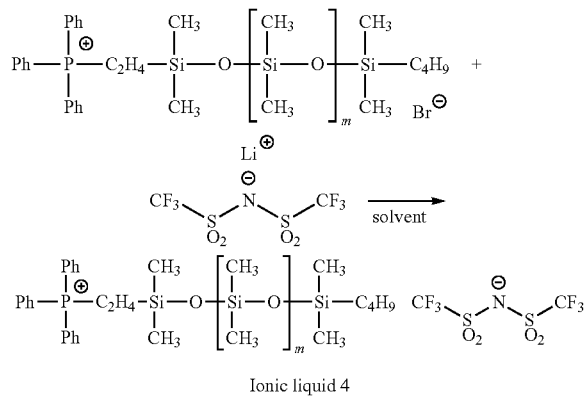

Ionic liquid 4

Production Example 4: Synthesis of Ionic Liquid 5

Firstly, the terminal hydroxy group of a commercially available monohydroxy terminated polydimethylsiloxane was converted into a halide.

Into an eggplant flask, 20.0 g of monohydroxy terminated polydimethylsiloxane (trade name: MCR-C12, molecular weight=1,000, produced by GELEST) and 6.3 g of triphenylphosphine were charged, air was replaced with argon, and methylene chloride (100 mL) was added thereto as a solvent. While the eggplant flask was ice-cooled, 5.1 g of iodine was added thereto, and the mixture was reacted for 30 minutes. After that, an aqueous solution of saturated sodium thiosulfate was added dropwise thereto to stop the reaction, and the obtained reaction liquid was extracted with methylene chloride. Magnesium sulfate was added to the organic layer of the extract to remove water, the precipitate was removed by filtration, and the solvent was removed by an evaporator. Subsequently, the product was purified with the use of column chromatography (trade name: silica gel 60N, 100 to 210 μm, produced by Kanto Chemical Co., Inc.), and the solvent was removed by an evaporator; and thereby, a monohalide terminated modified siloxane was obtained in which a terminal alcohol was converted into a halide. This reaction formula is shown below.

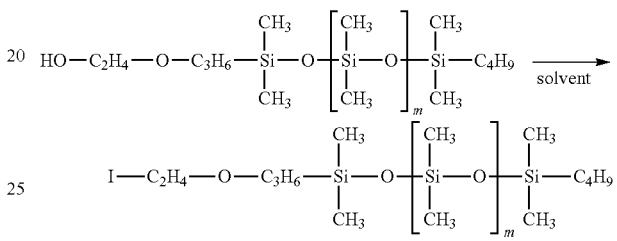

Monohalide terminated modified siloxane

Next, 0.3 g of tributylamine (produced by Tokyo Chemical Industry Co., Ltd.), and 5.0 g of the obtained monohalide terminated modified siloxane, were added to 20 mL of acetonitrile working as a solvent, and then the tributylamine and the monohalide terminated modified siloxane was reacted at room temperature for 3 hours. Then, the solvent was removed by an evaporator, and thereby an intermediate was synthesized which was formed from imidazolium having siloxane and a halide anion.

This reaction formula is shown below.

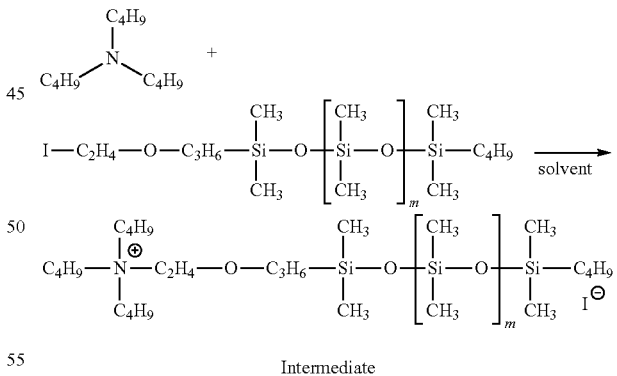

Intermediate

Subsequently, 20 mL of methanol was added to 2.5 g of the obtained intermediate, and such a solution was added dropwise thereto that 0.6 g of lithium bis(trifluoromethane sulfonyl) imide (produced by Kanto Chemical Co., Inc.) was dissolved in 10 mL of methanol. The mixture was reacted at room temperature for 3 hours, then the solvent was removed by an evaporator, and the product was purified by column chromatography; and then, the solvent was removed by an evaporator, and an ionic liquid 5 was obtained. This reaction formula is shown below.

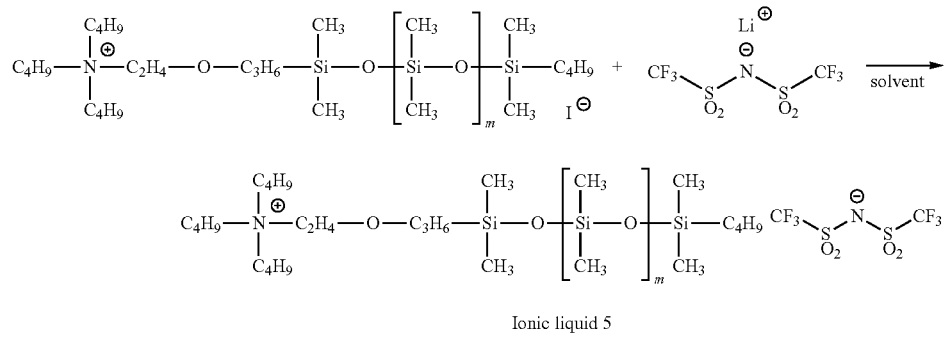

Ionic liquid 5

Production Example 5: Synthesis of Ionic Liquid 6

An ionic liquid 6 was obtained in the same manner as in Production Example 3, except that hexadecyl tri-n-butyl phosphonium bromide (produced by Sigma-Aldrich Co., LLC.) was used in place of the ionic liquid 3. This reaction formula is shown below.

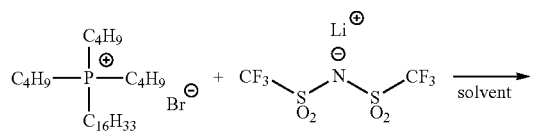

-continued

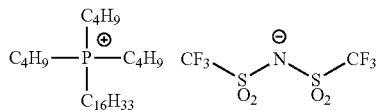

Ionic liquid 6

The ionic liquids used in each of Examples and Comparative Examples are shown in the following Table 1

For information, as the ionic liquid 1, a commercial product was used which was produced by Fujifilm Wako Pure Chemical Corporation.

TABLE 1

| | |
|---|---|
| Ionic liquid 1 | 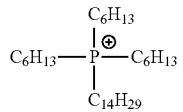 |
| | 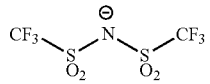 |
| Ionic liquid 2 | 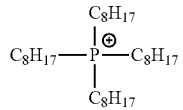 |
| | 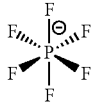 |
| Ionic liquid 3 | 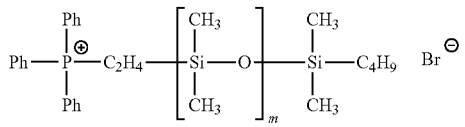 |
| | m = 8 to 10 |

TABLE 1-continued

Ionic liquid 4

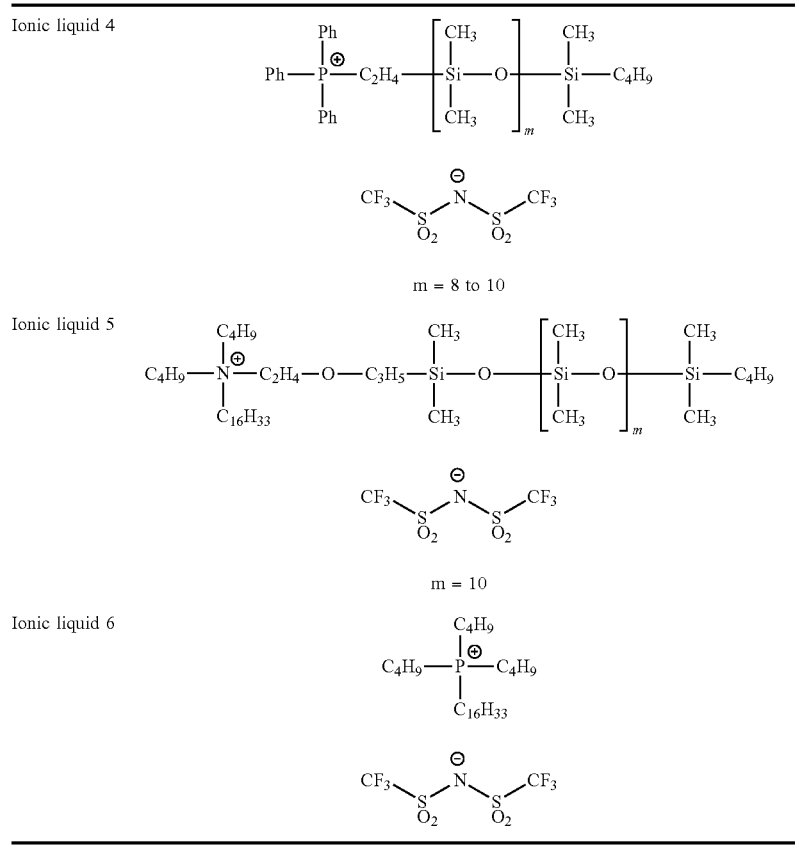

m = 8 to 10

Ionic liquid 5 m = 10

Ionic liquid 6

<XRD Measurement>

XRD measurement for determining the interlayer distance of the layered compound was performed under the following conditions.

- Apparatus: sample horizontal type multi-purpose X-ray diffraction apparatus (trade name: UltimaIV, manufactured by Rigaku Corporation)
- X-ray source: Cu-Kα ray
- Tube voltage/current: 40 Kv/40 mA
- Method: parallel method
- Scanning range: 5° to 70°
- Step width: 0.1°
- Number of integration times: 5 times The inorganic layered double hydroxide compound used in each of Examples and a chemical compound used in place of the inorganic layered double hydroxide compound in Comparative Example are shown in the following Table 2.

TABLE 2

| Layered compound 1 | Hydrotalcite compounds $(Mg_{1-x}Al_x(OH)_2(CO3)_{x/2} \cdot mH_2O)$ (Trade name: DHT-4C; produced by Kyowa Chemical Industry Co., Ltd.) Average value of interlayer distances: 7 Å Molar ratio $(MgO/Al_2O_3)$ = 4.16 |
| --- | --- |
| Layered compound 2 | Hydrotalcite $(Mg_6Al_2(OH)_{16}CO_3 \cdot 4H_2O)$ (produced by Fujifilm Wako Pure Chemical Corporation) Average value of interlayer distances: 8 Å |
| Chemical compound 3 | Magnesium/aluminum solid solution $(Mg_{0.7}Al_{0.3}O_{1.15})$ (Trade name: KW-2100; produced by Kyowa Chemical Industry Co., Ltd.) Average value of interlayer distances: 2 Å |

Production of Belt for Electrophotography

Example 1

(Preparation of Base Layer)

The following materials were each charged into a twin-screw kneading machine (trade name: PCM30, manufactured by Ikegai Corp.) with the use of a weight type feeder, and were kneaded, and a pellet of these materials was obtained. As for a preset temperature of a cylinder of the twin-screw kneading machine, a material charging portion was set at 320° C., and the downstream side of the cylinder and the die were set at 360° C. The number of rotations of the screw of the twin-screw kneading machine was set at 300 rpm, and the amount of material to be supplied was set at 8 kg/h.

Polyetheretherketone (trade name: VICTREXPEEK450G, produced by Victrex): 80 parts by mass Acetylene black (trade name: Denka Black Granular Product, produced by Denka Company Limited): 20 parts by mass Subsequently, the obtained pellet was subjected to cylindrical extrusion, and thereby, a base layer having an endless shape was prepared. The cylindrical extrusion was carried out with the use of a single-screw extruder (trade name: GT40, manufactured by Research Laboratory of Plastics Technology Co., Ltd.) equipped with a cylindrical die having a circular opening of 300 mm in diameter and 1 mm in gap.

Specifically, the pellet was supplied to the single-screw extruder at a supply amount of 4 kg/h with the use of a weight type feeder. As for a preset temperature of the cylinder of the single-screw extruder, a material charging portion was set at 320° C., and the downstream side of the cylinder and the cylindrical die were set at 380° C. A molten resin discharged from the single-screw extruder was extruded from the cylindrical die through a gear pump, and was drawn by a cylindrical drawing machine at such a speed that the thickness became 60 μm. The molten resin came in contact with a cooling mandrel which was provided between the cylindrical die and the cylindrical drawing machine, in the drawing process, and thereby was cooled and solidified. The solidified resin was cut into a width of 400 mm by a cylindrical cutting machine which was installed at a lower part of the cylindrical drawing machine, and the base layer having the endless shape was obtained.

(Preparation of Elastic Layer)

To 100 parts by mass of an addition cure liquid silicone rubber (trade name: TSE3450 A/B, produced by Momentive Performance Materials Inc.), 3.0 parts by mass of the ionic liquid 1 was added, and the mixture was mixed. Subsequently, as the inorganic layered double hydroxide compound according to the present disclosure, 1.0 part by mass of the layered compound 1 was added; and further 3.0 parts by mass of hydrophilic silica (trade name: AEROSIL380, produced by Nippon Aerosil Co., Ltd.), and 1.0 part by mass of black coloring material (trade name: LIMS-COLOR-02; produced by Shin-Etsu Chemical Co., Ltd.) were added thereto. After that, the mixture was stirred and defoamed with the use of a planetary stirring degassing apparatus (trade name: HM-500, manufactured by Keyence Corporation), and an addition cure liquid silicone rubber mixture was obtained.

Subsequently, the outer surface of the above base layer was subjected to ultraviolet irradiation treatment, then a primer (trade name: DY39-051, produced by Dow Corning Toray Co., Ltd.) was applied thereonto, and was dried by heating. The base layer having a primer layer formed on the outer surface thereof was attached to a cylindrical core, and a ring nozzle for discharging rubber was further attached onto the same axis as that of the core. The above addition cure liquid silicone rubber mixture was supplied to the ring nozzle with the use of a liquid feed pump, and was discharged through a slit, and thereby a layer of the addition cure liquid silicone rubber mixture was formed on the base layer. At this time, the relative movement speed and the discharge amount of the liquid feed pump were adjusted so that a thickness of the elastic layer after curing became 280 μm. The product was charged into a heating furnace in the state of being attached to the core, and was heated at 130° C. for 15 minutes and further at 180° C. for 60 minutes; and thereby the layer of the addition cure liquid silicone rubber mixture was cured, and the elastic layer was formed.

(Preparation of Surface Layer)

A fluorine-containing polyurethane resin liquid (trade name: Emralon T-861, produced by Henkel Japan Ltd.) was prepared in which polytetrafluoroethylene was dispersed in a polyurethane dispersion. Subsequently, the outer surface of the elastic layer was subjected to hydrophilic treatment by excimer UV irradiation, then the resultant product was fitted over a core, and the urethane resin liquid was applied to the product with the use of a spray gun (trade name: W-101, manufactured by ANEST IWATA Corporation) while the product was rotated at 200 rpm. After the application, the resultant product was charged into a heating furnace at 130° C., and was cured for 30 minutes. Thus, a belt for electrophotography No. 1 was obtained which had the surface layer having a thickness of 3 μm on the elastic layer.

Examples 2 to 8 and Comparative Examples 1 to 4

Belts for electrophotography Nos. 2 to 12 according to Examples 2 to 8 and Comparative Examples 1 to 4 were obtained in the same manner as in Example 1, except that the types and the compositions of the employed materials were changed as described in the following Table 3.

TABLE 3

|  | Example | | | | | | | | Comparative Example | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| Belt for electrophotography No. | 1 | 2 | 3 | 4 | 5 | 6 | 7 | 8 | 9 | 10 | 11 | 12 |
| Ionic liquid 1 | 3.0 |  |  |  |  | 0.01 |  |  | 3.0 | 3.0 |  |  |
| Ionic liquid 2 |  | 3.0 |  |  |  |  |  |  |  |  |  |  |
| Ionic liquid 3 |  |  | 3.0 |  |  |  |  |  |  |  |  |  |
| Ionic liquid 4 |  |  |  | 3.0 |  |  | 12.0 | 9.0 |  |  |  |  |
| Ionic liquid 5 |  |  |  |  | 6.0 |  |  |  |  |  |  |  |
| Ionic liquid 6 |  |  |  |  |  |  |  |  |  |  | 3.0 | 3.0 |
| Layered compound 1 | 1.0 |  | 1.0 | 1.0 | 2.0 | 0.05 | 5.0 | 1.5 |  | 1.0 |  |  |
| Layered compound 2 |  | 1.0 |  |  |  |  |  |  |  |  |  |  |
| Chemical compound 3 |  |  |  |  |  |  |  |  |  | 3.0 |  |  |
| Hydrophilic silica | 3.0 | 3.0 | 3.0 | 3.0 |  | 3.0 | 3.0 |  | 3.0 | 3.0 | 3.0 | 3.0 |

(Unit: parts by mass for 100 parts by mass of elastic layer matrix rubber)

<Evaluation>

The belts for electrophotography Nos. 1 to 12 were subjected to the following evaluations.

There were measured the initial volume resistivity and the back surface ρs, and the back surface ρs after a DC voltage of 1,000 V was applied to the belt for electrophotography. In addition, the value was calculated as a change rate of the back surface ρs, which was obtained by multiplying a value by 100, which was obtained by dividing an absolute value of a difference between the initial back surface ρs and the back surface ρs after the application of the voltage, by the initial back surface ρs.

In addition, the image was evaluated which was obtained when each belt for electrophotography was used as the intermediate transfer belt and was supplied to formation of an electrophotographic image.

[Measurement of Initial Volume Resistivity and Back Surface ρs]

On each of the belts for electrophotography Nos. 1 to 12 according to the above Examples and Comparative Examples, before being supplied to the formation of the electrophotographic image, the volume resistivity and the back surface ρs were measured in the following way.

Specifically, values of the initial volume resistivity and the back surface ρs were defined as average values of values obtained by measurements of 58 points at 20 mm intervals for each belt for electrophotography having a peripheral length of 1147 mm.

The volume resistivity and the back surface ρs were measured according to Japanese Industrial Standards (JIS) K6271-1: 2015, respectively, with the use of a high resistivity meter (trade name: Hiresta MCP-HT450, manufactured by Mitsubishi Chemical Analytech Co., Ltd.). As an electrode, a "UR probe" was used. Further, as each of the values of the initial volume resistivity and initial back surface ρs at the 58 points, a value obtained when a voltage of 1,000 V was applied for 10 seconds was employed. For information, the measurement was carried out in an environment of a normal temperature and a normal humidity (temperature of 25° C. and relative humidity of 55%).

[Evaluation of Surface Properties]

The surface of the belt for electrophotography according to each of Examples or Comparative Examples was visually observed, and was evaluated according to the following criteria.

(Evaluation Criteria of Surface Properties)

Rank A: a salient originating in an agglomerate of the layered compound is not observed.

Rank B: the salient originating in the agglomerate of the layered compound is observed.

[Measurement of Back Surface ρs After Formation of Electrophotographic Image, and Evaluation of Image]

In place of an intermediate transfer belt attached to the full-color electrophotographic image forming apparatus (trade name: image PRESS C800, manufactured by Canon Inc.), a belt for electrophotography according to each of Examples or Comparative Examples was attached thereto as the intermediate transfer belt. Then, a cyan solid image was output on plain paper of A4 size (trade name: CS-680A4, produced by Canon Inc.). For information, for forming images, cyan and magenta developers were used which were mounted in print cartridges of the above electrophotographic image forming apparatus. In addition, the images were output in an environment of a normal temperature and a normal humidity (temperature of 25° C. and relative humidity 55%). For information, in the full-color electrophotographic image forming apparatus, a primary transfer unit included a transfer roller which was arranged so as to face the electrophotographic photoreceptor via the intermediate transfer belt; and the primary transfer voltage was 1000 to 3000 V, and the secondary transfer voltage was 1000 V.

Under the above output conditions, 100 sheets of images were output. Subsequently, the paper was changed to plain paper of B5 size (trade name: CS-680B5, produced by Canon Inc.), and 80,000 sheets were continuously output. Further subsequently, the paper was changed to plain paper of A4 size (trade name: CS 680A4, produced by Canon Inc.), and one sheet of image was output. After that, the intermediate transfer belt which was an object to be evaluated was removed from the full-color electrophotographic image forming apparatus, and the back surface ρs was measured in the same manner as the above initial measurement of the back surface ρs. The back surface ρs was calculated by arithmetically averaging the obtained values. The back surface ρs obtained here is referred to as the back surface ρs after the voltage application.

Furthermore, in the above formation of the electrophotographic image, an image which was output on a 100th sheet (hereinafter also referred to as "initial image") was visually observed. In addition, an 80000th sheet of image (hereinafter also referred to as "final image") which was output last was visually observed. Then, the observed results were evaluated according to the following criteria.

(Evaluation Criteria of Image)

Rank A: toner scattering is not observed.
Rank B: toner scattering is observed only slightly.
Rank C: toner scattering is observed.
Rank D: toner scattering is remarkable.

The above evaluation results are shown in Table 4.

TABLE 4

|  |  | Belt for electrophotography No. | Surface properties | Initial volume resistivity ($\Omega \cdot$ cm) | Back surface ρs ($\Omega/\square$) | | Change rate of volume resistivity | Rank of image evaluation | |
|---|---|---|---|---|---|---|---|---|---|
|  |  |  |  |  | Initial stage | After voltage application |  | Initial image | Final image |
| Example | 1 | 1 | A | 3.8E+10 | 5.8E+10 | 5.2E+10 | −10% | A | A |
|  | 2 | 2 | A | 4.9E+10 | 6.1E+10 | 4.9E+10 | −20% | A | A |
|  | 3 | 3 | A | 6.1E+10 | 6.2E+10 | 3.8E+10 | −39% | A | A |
|  | 4 | 4 | A | 5.6E+10 | 5.3E+10 | 4.8E+10 | −9% | A | A |
|  | 5 | 5 | A | 2.3E+10 | 4.9E+10 | 4.2E+10 | −14% | A | A |
|  | 6 | 6 | A | 9.7E+10 | 6.8E+10 | 5.0E+10 | −26% | A | A |
|  | 7 | 7 | B | 8.2E+09 | 4.7E+10 | 4.4E+10 | −6% | A | A |
|  | 8 | 8 | A | 8.5E+09 | 4.8E+10 | 4.5E+10 | −6% | A | A |
| Comparative Example | 1 | 9 | A | 3.7E+10 | 5.8E+10 | 1.1E+09 | −98% | A | C |
|  | 2 | 10 | A | 3.7E+10 | 6.0E+10 | 1.4E+09 | −98% | A | C |
|  | 3 | 11 | A | 1.1E+11 | 5.2E+10 | 1.5E+09 | −97% | A | C |
|  | 4 | 12 | A | 3.2E+10 | 5.0E+10 | 1.1E+09 | −98% | A | C |

[Analysis of Anion and Cation in Elastic Layer]

From the elastic layer of the belt for electrophotography according to each of Examples, 200 mg of sample was collected, and was immersed in 1 mL of methanol; and then ultrasonic waves of 40 kHz were applied thereto for 10 minutes. After that, the resultant sample was subjected to centrifugal separation at 12000 rpm for 10 minutes, with the use of a high-speed centrifuge 7780 (Kubota Corporation), and the supernatant liquid was separately collected. The supernatant liquid was subjected to mass spectrometry of the extracted liquid, with the use of a linear ion trap mass spectrometer (trade name: ThermoScientificLTQ OrbitrapXL; manufactured by Thermo Fisher Scientific K.K.).

[Mass Spectrometry Conditions]

Direct introduction method

Injected quantity: 2 μL

Ionization method: electrospray ionization (ESI)

As a result, peaks other than those caused by the anions and cations derived from the ionic liquid used in the formation of the elastic layer and other than peaks originating from the decomposition products thereof were not observed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-067255, filed Apr. 12, 2021, and Japanese Patent Application No. 2022-039155, filed Mar. 14, 2022, which are hereby incorporated by reference herein in their entirety.

What is claimed is:

1. An electrophotographic member comprising a base layer and an elastic layer on the base layer, wherein
   the elastic layer comprises a rubber mixture comprising rubber as a matrix, an anion, a cation, and an inorganic layered double hydroxide compound, wherein
   the anion is at least one selected from the group consisting of structural formulae (1) to (3),
   the cation is at least one selected from the group consisting of structural formulae (4) to (7), and
   the inorganic layered double hydroxide compound has an average value of interlayer distances of 4 Å or larger and 8 Å or smaller, which are measured by XRD:

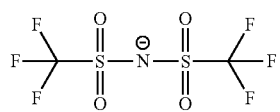

Structural formula (1)

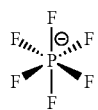

Structural formula (2)

Structural formula (3)

(wherein in structural formula (3), X represents a halogen element;)

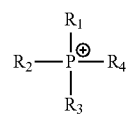

Structural formula (4)

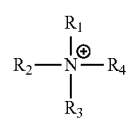

Structural formula (5)

(wherein in structural formulae (4) and (5), $R_1$ to $R_4$ each independently represent an alkyl group having 6 to 16 carbon atoms, an alkoxy group having 6 to 16 carbon atoms, a hydroxyl group, a phenyl group, a benzyl group or a carboxyl group;)

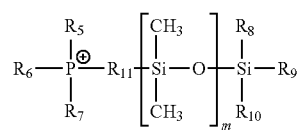

Structural formula (6)

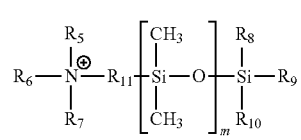

Structural formula (7)

(wherein in structural formulae (6) and (7), $R_5$ to $R_7$ each independently represent an alkyl group having 4 to 16 carbon atoms, an alkoxy group having 4 to 16 carbon atoms, a hydroxyl group, a phenyl group, a benzyl group or a carboxyl group; $R_8$ to $R_{10}$ each independently represent an alkyl group having 1 to 16 carbon atoms;

$R_{11}$ represents an alkylene group having 1 to 16 carbon atoms, which optionally has a substituent; the alkylene group optionally has a structure through a group selected from the group consisting of -Ph-, —O—, —C(=O)—, —C(=O)—O—, and —C(=O)—NR— (where R represents an alkyl group having 1 to 6 carbon atoms); and m represents an integer of 1 or more and 16 or less.).

2. The electrophotographic member according to claim 1, wherein the inorganic layered double hydroxide compound is represented by the following chemical formula:

$$M^{2+}_{(1-X)}M^{3+}_X(OH)_2A^{n-}_{(X/n)} \cdot mH_2O$$

(wherein $0<X\leq 0.5$, $m\leq 0$, $M^{2+}$; divalent metal ion, $M^{3+}$; trivalent metal ion, $A^{n-}$; n-valent anion, and n represents an integer of 1 or more.).

3. The electrophotographic member according to claim 1, wherein the rubber is a silicone rubber.

4. The electrophotographic member according to claim 3, wherein the elastic layer is a cured product of an addition cure liquid silicone rubber mixture comprising an addition cure liquid silicone rubber, an ionic liquid comprising the anion and the cation, and the inorganic layered double hydroxide compound.

5. The electrophotographic member according to claim 1, wherein a content of the inorganic layered double hydroxide compound is 0.05 parts by mass or more and 5 parts by mass or less with respect to 100 parts by mass of the rubber.

6. The electrophotographic member according to claim 1, wherein a total amount of the anion and the cation is 0.01 parts by mass or more and 12 parts by mass or less with respect to 100 parts by mass of the rubber.

7. The electrophotographic member according to claim 1, wherein the rubber mixture further comprises hydrophilic silica.

8. The electrophotographic member according to claim 1, wherein the base layer is a thermosetting resin or a thermoplastic resin.

9. The electrophotographic member according to claim 1, wherein the electrophotographic member is a belt for electrophotography having an endless belt shape.

10. The electrophotographic member according to claim 1, wherein the elastic layer substantially does not contain other anions that are not captured by the inorganic layered double hydroxide compound.

11. The electrophotographic member according to claim 1, wherein the elastic layer substantially does not contain other cations that are captured by the inorganic layered double hydroxide compound.

12. An electrophotographic image forming apparatus comprising an intermediate transfer member, wherein
   the intermediate transfer member is an electrophotographic member, wherein
   the electrophotographic member comprises a base layer and an elastic layer on the base layer, wherein
   the elastic layer comprises a rubber mixture comprising rubber as a matrix, an anion, a cation, and an inorganic layered double hydroxide compound, wherein
   the anion is at least one selected from the group consisting of structural formulae (1) to (3),
   the cation is at least one selected from the group consisting of structural formulae (4) to (7), and
   the inorganic layered double hydroxide compound has an average value of interlayer distances of 4 Å or larger and 8 Å or smaller, which are measured by XRD:

Structural formula (1)

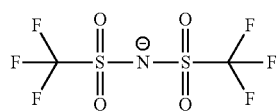

Structural formula (2)

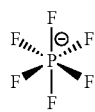

Structural formula (3)

(wherein in structural formula (3), X represents a halogen element;)

Structural formula (4)

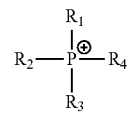

Structural formula (5)

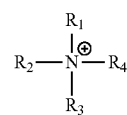

(wherein in structural formulae (4) and (5), $R_1$ to $R_4$ each independently represent an alkyl group having 6 to 16 carbon atoms, an alkoxy group having 6 to 16 carbon atoms, a hydroxyl group, a phenyl group, a benzyl group or a carboxyl group;)

Structural formula (6)

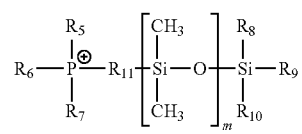

Structural formula (7)

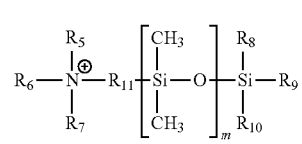

(wherein in structural formulae (6) and (7), $R_5$ to $R_7$ each independently represent an alkyl group having 4 to 16 carbon atoms, an alkoxy group having 4 to 16 carbon atoms, a hydroxyl group, a phenyl group, a benzyl group, or a carboxyl group; $R_8$ to $R_{10}$ each independently represent an alkyl group having 1 to 16 carbon atoms;

$R_{11}$ represents an alkylene group having 1 to 16 carbon atoms, which optionally has a substituent; the alkylene group optionally has a structure through a group selected from the group consisting of -Ph-, —O—, —C(=O)—, —C(=O)—O—, and —C(=O)—NR— (where R represents an alkyl group having 1 to 6 carbon atoms); and m represents an integer of 1 or more and 16 or less.).

* * * * *